United States Patent [19]
Lewis

[11] Patent Number: 5,727,999
[45] Date of Patent: Mar. 17, 1998

[54] VEHICLE VENTILATION VALVE

[75] Inventor: Jeffrey C. Lewis, Rochester Hills, Mich.

[73] Assignee: TRW Inc., Cleveland, Ohio

[21] Appl. No.: 807,722

[22] Filed: Feb. 28, 1997

[51] Int. Cl.$^6$ .................................................. B60H 1/24
[52] U.S. Cl. ..................... 454/162; 137/855; 137/527.8
[58] Field of Search ........................... 454/162, 164, 454/165; 137/855, 527.8

[56] References Cited

U.S. PATENT DOCUMENTS

| | | |
|---|---|---|
| 4,449,242 | 5/1984 | Sliney, Jr. . |
| 4,667,578 | 5/1987 | Hagenah . |
| 5,105,731 | 4/1992 | Kraus . |
| 5,124,897 | 6/1992 | Kraus . |
| 5,176,463 | 1/1993 | Kraus et al. . |
| 5,194,038 | 3/1993 | Klomhaus et al. . |
| 5,464,179 | 11/1995 | Ruckwardt . |
| 5,492,505 | 2/1996 | Bell et al. . |

*Primary Examiner*—Harold Joyce
*Assistant Examiner*—Derek S. Boles
*Attorney, Agent, or Firm*—Fay, Sharpe, Beall, Fagan, Minnich & McKee

[57] ABSTRACT

A one-way flap-type vehicle ventilation valve comprises a generally planar molded plastic sealing flap for overlying a flow opening formed through a vehicle body panel. The flap is formed in a two shot molding process to have a rigid plastic main body with a resilient plastic seal lip about its periphery. A plastic support shaft is molded integrally with the main body and is spaced therefrom by integral support webs. A plastic support is pivotally joined to the support shaft by connecting portions of the bracket that are molded about the ends of the support shaft. Fasteners extend from the bracket for joining the valve to the vehicle body panel. The fasteners include end portions for passing through holes formed through the vehicle body panel adjacent the flow opening.

16 Claims, 3 Drawing Sheets

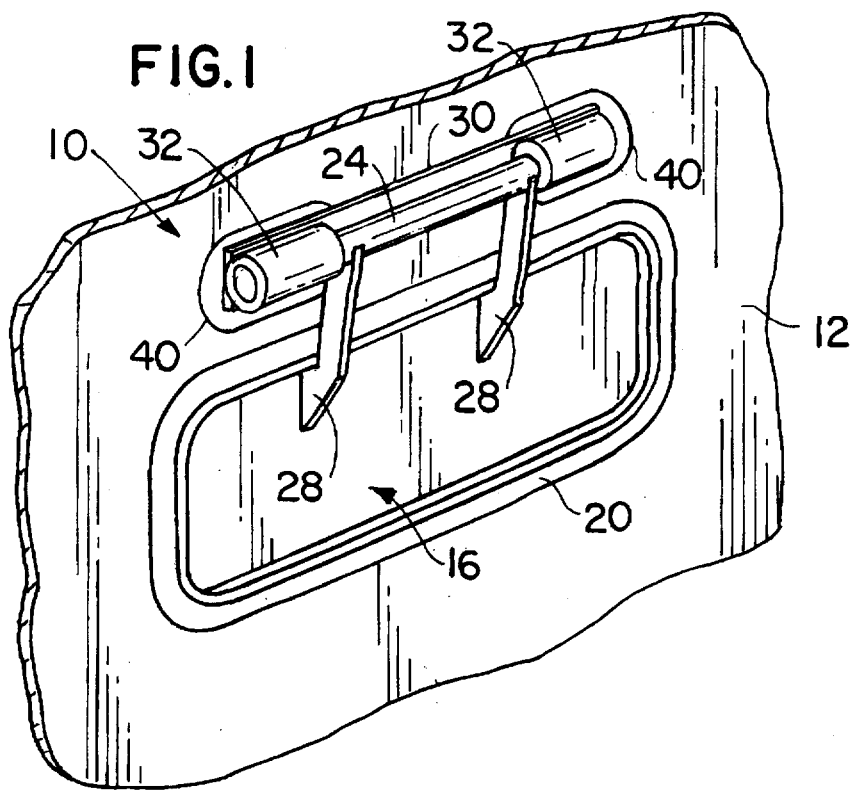
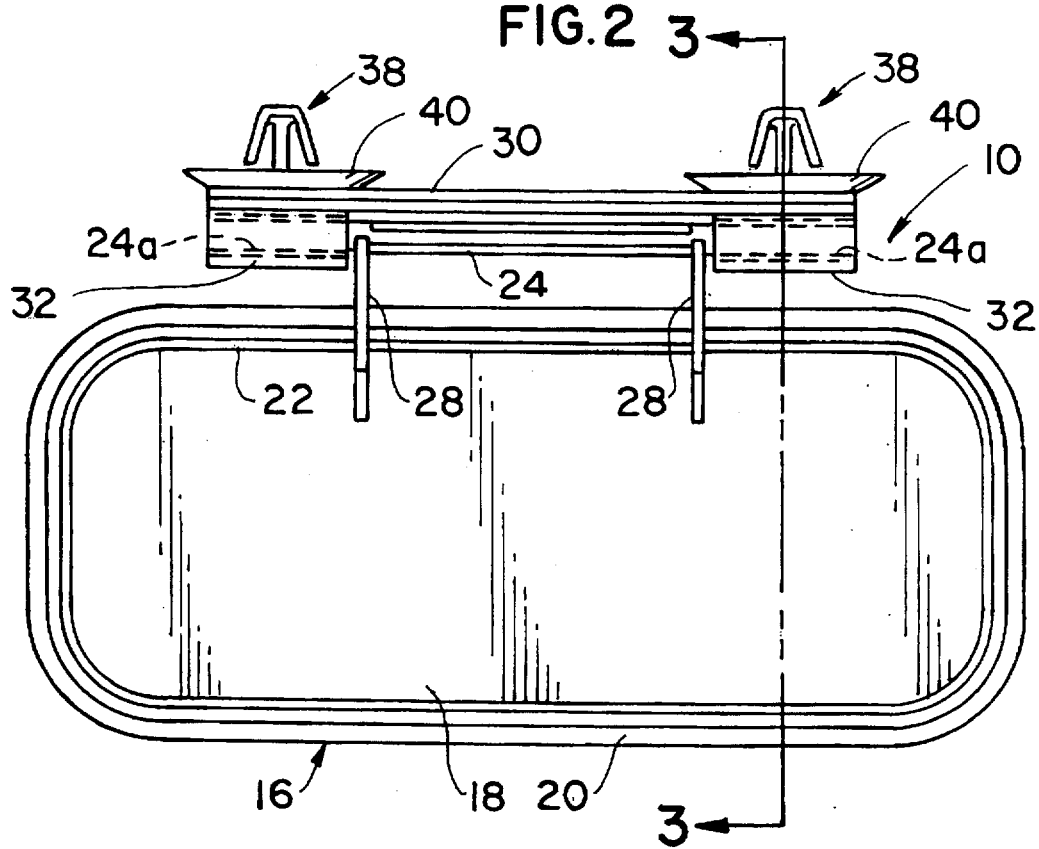

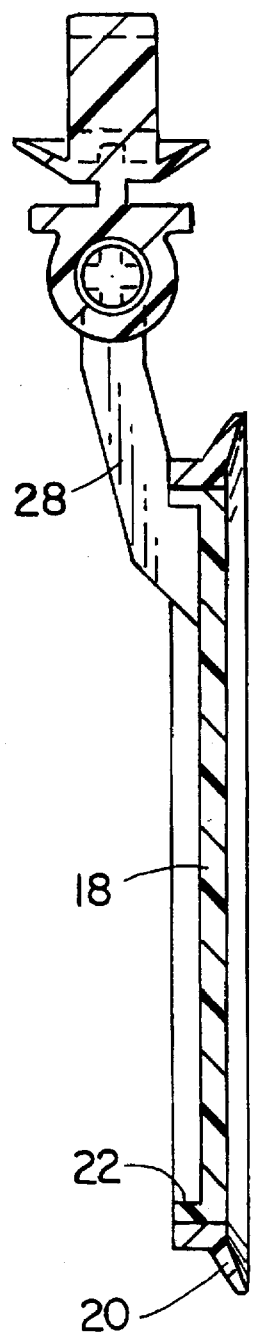
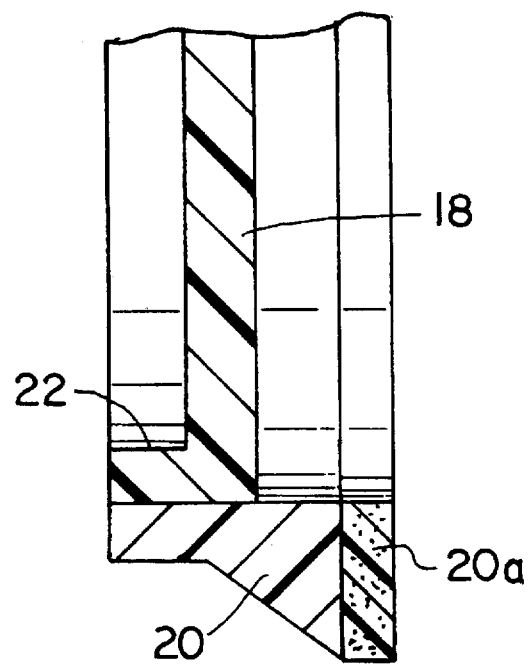

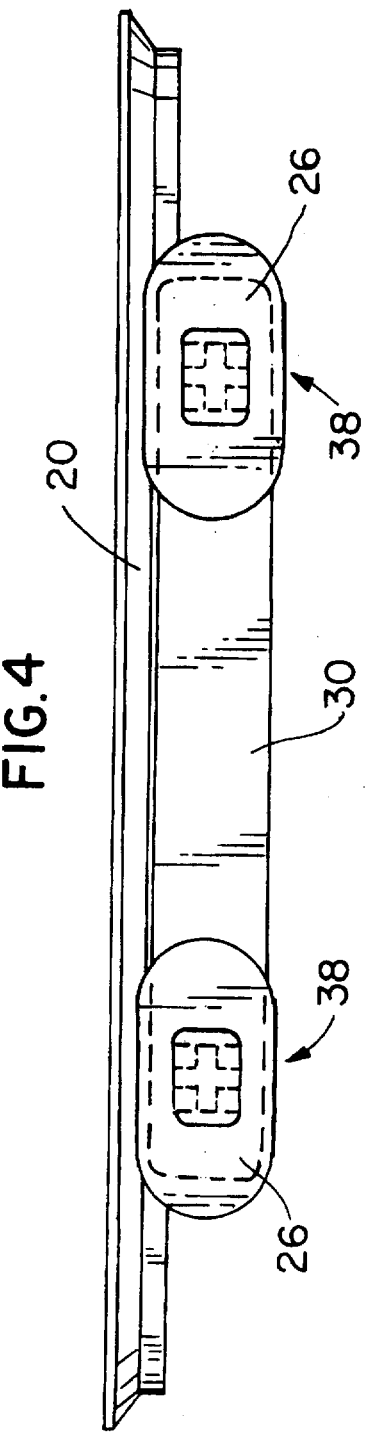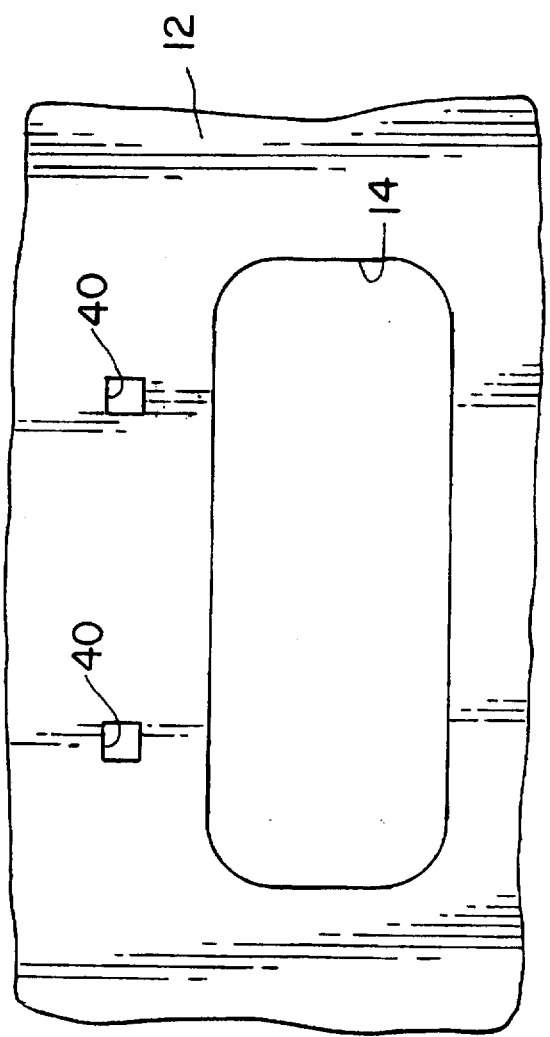

5,727,999

VEHICLE VENTILATION VALVE

BACKGROUND OF THE INVENTION

The subject invention is directed toward the art of vehicle ventilation systems and, more particularly, to a one-way, flap-type vehicle ventilation valve.

In vehicle ventilation systems, it is well known to provide a one-way type valve to allow venting of overpressure conditions within the vehicle passenger compartment. The valves are typically flap-type valves positioned over a panel opening to move to an open position whenever the air pressure within the vehicle passenger compartment exceeds a predetermined level, such as when the vehicle doors are slammed shut or, at times, when the vehicle ventilation system is set to provide the passenger compartment with a large amount of excess exterior air.

The valves have taken a variety of different designs but have generally included a multiple part frame or housing to which is attached a resilient flap valve through the use of a plurality of rivets, screws, or the like. The housing itself is generally also mounted to the vehicle body panels using multiple fasteners. The overall structures have often been somewhat complex and time consuming to assemble and install.

SUMMARY OF THE INVENTION

The subject invention provides a highly simplified structure in which the mounting portion including the fasteners can be formed and molded simultaneously with the flap valve itself. The design is such that it mounts directly adjacent a pre-formed vehicle panel opening and does not require any specific frame, separate fasteners, or the like.

In particular, and in accordance with one aspect of the invention, there is provided a one-way, flap-type vehicle ventilation valve which includes a generally planar molded plastic sealing flap for overlying a flow opening formed through a vehicle body panel. A plastic support shaft is molded integrally with the sealing flap and is spaced and supported therefrom by integral molded support webs. A plastic support bracket is pivotally joined to the support shaft by connecting portions of the bracket that are molded about the support shaft. Additionally, fasteners extend from the bracket for joining the valve to the vehicle body panel. Preferably, the fasteners are molded integrally with the bracket and include retaining end portions adapted to pass through and join with holes adjacent the flow opening.

In its preferred form, the connecting portions of the bracket include sleeve-like members that surround the shaft at the opposite ends of the shaft. The support webs are preferably arranged to engage the end of the sleeve-like members and locate the plastic sealing flap relative to the support bracket and to prevent lateral shifting of the sleeve-like members along the shaft.

It is also contemplated that the plastic sealing flap can be molded from two different materials, including a relatively stiff and rigid central body portion and a somewhat more flexible and pliant sealing edge portion that can be molded jointly through the use of conventional two-shot molding processes. It is also contemplated that the fasteners can be molded integrally with the support bracket to extend laterally therefrom at spaced locations. In the preferred embodiment, the fasteners are provided with resilient seals formed integrally about their upper ends so as to seal about the openings through which the fasteners are received.

In one embodiment, the sealing edge portion can be of a magnetic composition to provide a predetermined magnetic force joining the flap to the body panel so that a predetermined air pressure differential is required to open the flap.

As can be seen from the foregoing, a primary object of the invention is the provision of a one-way type flap valve for vehicle ventilation systems wherein the valve is molded as a single unit with all components being formed during the molding operation so that separate assembly steps are not required.

A still further object of the invention is the provision of a flap valve of the general type described where the mounting bracket and associated fasteners are formed integrally therewith and form a basically one-piece unitary structure.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is a pictorial view showing a preferred form of the invention mounted adjacent a vehicle body panel to overlie a pre-formed vent opening;

FIG. 2 is a top plan view of the valve assembly in its as formed, pre-installed, condition;

FIG. 3 is a cross-sectional view taken on line 3—3 of FIG. 2;

FIG. 4 is a side elevational view taken on line 4—4 of FIG. 2;

FIG. 5 is a view showing the body panel opening and mounting holes for installation of the valve assembly; and, FIG. 6 is a modified form of sealing edge portion using a magnetic material to form the seal.

DETAILED DESCRIPTION OF THE PREFERRED EMBODIMENT

Referring now to the drawings wherein the showings are for the purposes of illustrating the preferred embodiment of the invention only and not for purposes of limiting same, FIG. 1 shows the valve assembly 10 located in position on a vehicle body panel 12 to overlie and control air flow through an opening 14 formed through the body panel 12 (see FIG. 5).

In its basic design, the valve assembly 10 comprises a molded plastic sealing flap 16 (see FIGS. 2 and 3) that is generally flat and has a fluid impervious, relatively rigid main body 18 of somewhat rectangular shape with rounded corners. The body 18 is preferably molded from a relatively rigid, high strength plastic and carries a circumferentially extending, continuous sealing lip 20. In the preferred embodiment, the sealing lip 20 is molded directly to the outer periphery of the central or main body 18. The sealing lip is preferably formed from a relatively flexible and resilient plastic and formed integrally to the main body by the well known two-shot molding process. A circumferentially extending, upwardly directed reinforcing flange 22 is formed about the main body 18 and has the sealing lip 20 joined directly to the outer face thereof.

Associated with the sealing flap 16 is a rigid plastic support shaft 24 that extends generally parallel to the main longitudinal axis of the flap valve 16 and terminates in free end portions 24a. The support shaft 24 has its end portions 24a formed cylindrically. The central section of the shaft 24 could also be cylindrical, but has a somewhat cross-like shape resulting from inwardly extending recesses.

The shaft 24 is molded integrally with the sealing flap from the relatively rigid plastic and joins to the flap main body 18 by integral support webs 28 that are located to extend parallel from the main body 18 laterally thereof at the locations shown.

Connected to the free ends 24a of the shaft 24 for pivotal movement relative thereto is a main support bracket member 30 also molded from a suitable high strength and relatively rigid plastic. The bracket 30 is pivotally joined to the support shaft by connecting portions in the form of integral cylindrical sleeve-like members 32 molded about the ends 24a of shaft 24 and directly connected to the face of the bracket 30. This arrangement allows free pivoting movement of the flap valve 16 relative to the support bracket 30.

Formation of the sleeve-like members 32 directly about the free ends 24a of shaft 24 is achieved by suitable design of the molds to include slide sleeves that slide between the ends 24a and the interiors of members 32. During molding of shaft 24 and sleeve-like members 32, the slide sleeves are in position to maintain the components separate. After completion of the molding, the slide sleeves are retracted out and the assembled components can be removed from the mold in the usual manner.

It should be noted that the support webs 28 are located closely adjacent the inner ends of each of the sleeve-like members 32 so as to centrally locate and prevent axial sliding relative movement between the support bracket 30 and the valve flap 18. The webs 28 thus perform a centering and locating function while permitting free pivotal movement of the flap valve element 16.

In accordance with the preferred form of the invention, the bracket member 30 is provided with integral molded fastener elements 38 that are carried at opposite ends at a location directly across from, or opposed to, the sleeve-like members 32. In the subject embodiment, the fasteners 38 comprise a known type of push-in molded plastic fastener wherein a pair of resilient wings can be compressed radially inward toward their central axis to allow insertion through panel openings to a location wherein they can expand back to their normal position and engage behind the rear face of the panel. Specifically, referring to FIG. 5, the fasteners 38 are arranged so as to pass through pre-formed openings 40 formed in panel 12 to retain the mounting bracket 30 in position. Additionally, it should be noted that each of the fasteners 38 is associated with a resilient, generally oval-shaped, lip-type seal member which is molded about the base of the fastener from a more resilient and flexible plastic such that it seals about the opening 40 when the fasteners are moved into their final located position.

FIG. 6 shows a modified form for the sealing lip 20. In the FIG. 6 embodiment, the lip 20 of the main body 18 is provided with an integrally formed resilient magnetic end portion 20a. The magnetic end portion thus provides a predetermined connecting force holding the flap in closed position against the vehicle body panel. The magnet assures a complete seal against intrusion of foreign material and sound. Further, it assures that a seal is maintained until a predetermined overpressure is reached within the passenger compartment. This is beneficial during air bag deployment due to the fact the valve needs to be located close to the occupant in order to rapidly relieve the pressure build-up due to air bag deployment.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A one-way flap-type vehicle ventilation valve comprising:

a generally planar molded plastic sealing flap for overlying a flow opening formed through a vehicle body panel;

a plastic support shaft molded integrally with said sealing flap and spaced therefrom by integral support webs;

a plastic support bracket pivotally joined to said support shaft by connecting portions of said bracket that are molded about said support shaft; and, fasteners extending from said bracket for joining said valve to said vehicle body panel, said fasteners including end portions for passing through holes formed through the vehicle body panel adjacent the flow opening.

2. A vehicle ventilation valve as set forth in claim 1 wherein the molded plastic sealing flap includes a main body portion formed from a rigid plastic and a peripheral sealing lip formed from a magnetic material.

3. A vehicle ventilation valve as set forth in claim 2 wherein said fasteners are molded integrally with said bracket.

4. A vehicle ventilation valve as set forth in claim 1 including magnetic means carried on said sealing flap for causing said sealing flap to have a magnetic bias toward the vehicle body panel when said sealing flap is mounted thereon.

5. A vehicle ventilation valve as set forth in claim 1 wherein said connecting portions include cylindrical openings that receive said support shaft.

6. A vehicle ventilation valve as set forth in claim 5 wherein said connecting portions include sleeves that define said cylindrical openings.

7. A vehicle ventilation valve as set forth in claim 1 wherein said support bracket includes a rigid main body having an outer face, an inner face, and spaced terminal ends, said fasteners molded integrally on said inner face adjacent said terminal ends.

8. A vehicle ventilation valve as set forth in claim 7 wherein said connecting portions are formed adjacent said outer face in general alignment with said fasteners.

9. A vehicle ventilation valve as set forth in claim 7 wherein said connecting portions comprise sleeve members that encircle said shaft.

10. A vehicle ventilation valve as set forth in claim 9 wherein said shaft has end portions that terminate adjacent said terminal ends of said main body and said sleeve members enclose said end portions.

11. A vehicle ventilation valve as set forth in claim 9 wherein at least one of said support webs is located to engage at least one of said sleeve members to limit movement of said sealing flap in directions parallel to said shaft.

12. A one-way flap-type vehicle ventilation valve comprising:

a fluid impervious, generally flat, molded plastic sealing flap for overlying a flow opening formed through a vehicle body panel;

support webs molded integrally with said flap and extending outwardly from said flap and terminating in spaced free end portions;

a shaft carried by said support webs and extending between said free end portions;

a plastic support bracket extending generally parallel to said shaft;

connecting means pivotally joining said support bracket to said shaft, said connecting means including sleeve-like members surrounding said shaft with said support webs engaged with at least one of said sleeve-like members to prevent movement of said sleeve-like members axially of said shaft.

13. The valve as set forth in claim 12 wherein each of said support webs engages a separate one of said sleeve-like members.

14. The valve as set forth in claim 13 wherein there are two of said support webs and two of said sleeve-like members.

15. The valve as set forth in claim 14 wherein said support webs are located between said sleeve-like members.

16. The valve as set forth in claim 12 wherein the periphery of said sealing flap is defined by a magnetic strip.

* * * * *